United States Patent [19]
Weaver, Jr. et al.

[11] Patent Number: 5,475,870
[45] Date of Patent: Dec. 12, 1995

[54] APPARATUS AND METHOD FOR ADDING AND REMOVING A BASE STATION FROM A CELLULAR COMMUNICATIONS SYSTEM

[75] Inventors: Lindsay A. Weaver, Jr., Boulder, Colo.; Paul E. Bender, San Diego, Calif.

[73] Assignee: QUALCOMM Incorporated, San Diego, Calif.

[21] Appl. No.: 304,730

[22] Filed: Sep. 12, 1994

[51] Int. Cl.$^6$ ................................................ H04B 17/00
[52] U.S. Cl. .................... 455/67.1; 455/53.1; 455/56.1
[58] Field of Search ............................ 455/9, 33.1, 53.1, 455/54.2, 56.1, 63, 67.1, 115; 379/59

[56] References Cited

U.S. PATENT DOCUMENTS

| | | | |
|---|---|---|---|
| 4,771,448 | 9/1988 | Koohgoli et al. | 455/33.4 |
| 4,870,699 | 9/1989 | Garner et al. | 455/67.1 |
| 5,274,666 | 12/1993 | Dowdell et al. | 455/51.1 |
| 5,307,510 | 4/1994 | Gunmar et al. | 455/67.1 |
| 5,425,076 | 6/1995 | Knippelmier | 455/67.1 |

Primary Examiner—Reinhard J. Eisenzopf
Assistant Examiner—Andrew Faile
Attorney, Agent, or Firm—Russell B. Miller; Katherine W. White

[57] ABSTRACT

An apparatus and method for adding and removing a target base station from a network of base stations, which includes base stations adjacent the target base station. The apparatus is comprised of two attenuators: a first for setting an artificial receive noise power level and a second for setting a transmit level. The transmit level determines the forward link coverage area of the base station. The artificial noise level sets the reverse link coverage area of the base station. When a base station is added, initially the transmit power is low and the artificial receive noise power is high such that the forward and reverse link coverage areas are collocated in close proximity to the base station. As the base station blossoms into full operation, the artificial receive noise power is decreased and the transmit level is increased such that the two coverage areas of the base station remain balanced as the coverage areas expand. When a base station is to be removed from a system, the same attenuators are used to wilt the two coverage areas in unison as the power level transmitted from the base station decreases.

24 Claims, 6 Drawing Sheets

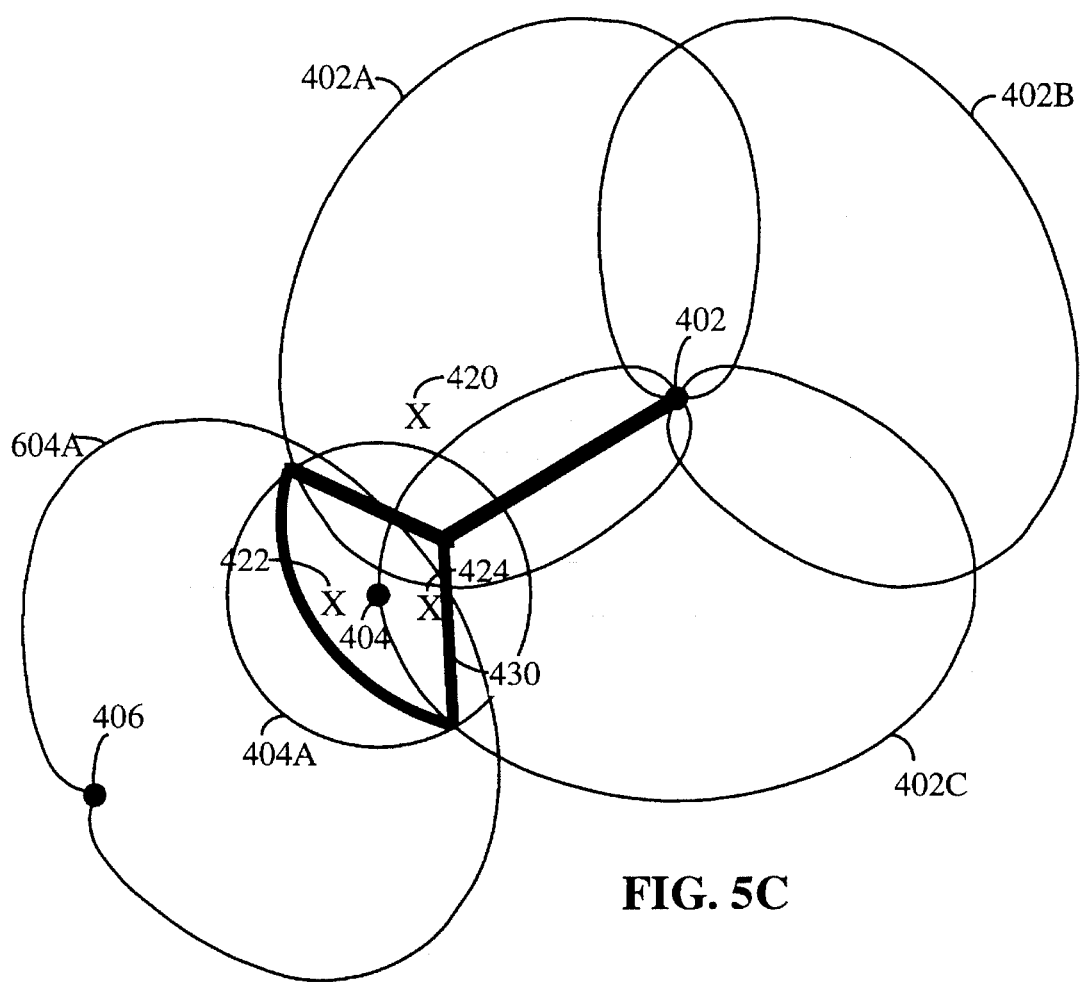
FIG. 5C
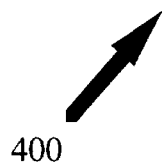
400

APPARATUS AND METHOD FOR ADDING AND REMOVING A BASE STATION FROM A CELLULAR COMMUNICATIONS SYSTEM

BACKGROUND OF THE INVENTION

I. Field of the Invention

The present invention relates to a communications system. More particularly, the present invention relates to an apparatus and method for adding and removing a cell-site base station from a cellular communications system when system loads increase or decrease or when base station maintenance is required.

II. Description of the Related Art

In some cellular telephone systems, personal communications systems and wireless local loop systems using code division multiple access (CDMA) coding technique, a common frequency band is used for communication with all base stations in the system. The common frequency band allows simultaneous communication between a mobile unit and more than one base station. Signals occupying the common frequency band are discriminated at the receiving terminal (either within the base station or mobile unit) through the spread spectrum CDMA waveform properties based on the use of high frequency pseudonoise (PN) codes and orthogonal Walsh codes. Transmitting terminals (either the base station or mobile unit) using different PN codes or PN codes that are offset in time or orthogonal Walsh codes produce signals that can be separately received at the receiving terminal.

In an exemplary CDMA system, each base station transmits a pilot signal having a common PN spreading code that is offset in code phase from the pilot signal of other base stations within the system. During system operation, the mobile unit is provided with a list of code phase offsets corresponding to neighboring base stations surrounding the base station through which communication is established. The mobile unit is equipped with a searching element that allows the mobile unit to track the signal strength of the pilot signal from a group of base stations including the neighboring base stations.

Various methods exist for switching the mobile unit from one base station to another (known as "handoff"). One such method is termed a "soft" handoff, in which communication between the mobile unit and the end user is uninterrupted by the eventual handoff from an original base station to a subsequent base station. This method is considered a soft handoff in that communication with the subsequent base station is established before terminating communication with the original base station. When the mobile unit is communicating with two base stations, a single signal for the end user is created from the signals from each base station by a cellular or personal communication system controller. U.S. Pat. No. 5,267,261 which is incorporated by this reference and assigned to the assignee of the present invention, discloses a method and system for providing communication with the mobile unit through more than one base station during the handoff process, i.e., providing soft handoff.

Mobile unit assisted soft handoff operates based on the pilot signal strength of several sets of base stations as measured by the mobile unit. An Active Set is the set of base stations through which active communication is established. A Neighbor Set is a set of base stations surrounding an active base station comprising base stations that have a high probability of having a pilot signal strength of sufficient level to establish communication. A Candidate Set is a set of base stations having a pilot signal strength of sufficient level to establish communication.

When communications are initially established, a mobile unit communicates through a first base station, and the Active Set contains only the first base station. The mobile unit monitors the pilot signal strength of the base stations in the Active Set, the Candidate Set, and the Neighbor Set. When a pilot signal of a base station in the Neighbor Set exceeds a predetermined threshold level, the base station is added to the Candidate Set and removed from the Neighbor Set at the mobile unit. The mobile unit communicates a message identifying the new base station. A cellular or personal communication system controller decides whether to establish communication between the new base station and the mobile unit. Should the cellular or personal communication system controller decide to do so, the cellular or personal communication system controller sends a message to the new base station with identifying information about the mobile unit and a command to establish communications with the mobile unit. A message is also transmitted to the mobile unit through the first base station. The message identifies a new Active Set that includes the first and new base stations. The mobile unit searches for the new base station's transmitted information signal, and communication is established with the new base station without termination of communication through the first base station. This process can continue with additional base stations.

When the mobile unit is communicating through multiple base stations, it continues to monitor the signal strength of the base stations of the Active Set, the Candidate Set, and the Neighbor Set. Should the signal strength corresponding to a base station of the Active Set drop below a predetermined threshold for a predetermined period of time, the mobile unit generates and transmits a message to report the event. The cellular or personal communication system controller receives this message through at least one of the base stations with which the mobile unit is communicating. The cellular or personal communication system controller may decide to terminate communications through the base station having a weak pilot signal strength.

Upon deciding to terminate communications through a base station, the cellular or personal communication system controller generates a message identifying a new Active Set of base stations. The new Active Set does not contain the base station through which communication is to be terminated. The base stations through which communication is established send a message to the mobile unit. The mobile unit communications are thus routed only through base stations identified in the new Active Set.

Because the mobile unit is communicating with the end user through at least one base station at all times throughout the soft handoff processes, no interruption in communications occurs between the mobile unit and the end user. A soft handoff provides significant benefits in its inherent "make before break" communication over conventional "break before make" techniques employed in other cellular communication systems.

In a cellular or personal communication telephone system, maximizing the capacity of the system in terms of the number of simultaneous telephone calls that can be handled is extremely important. System capacity in a spread spectrum system can be maximized if the transmitter power of each mobile unit is controlled such that each transmitted signal arrives at the base station receiver at the minimum level required to maintain the link. If a signal transmitted by a mobile unit arrives at the base station receiver at a power level that is too low, the bit-error-rate may be too high to permit high quality communications due to interference from the other mobile units. If, on the other hand, the mobile unit transmitted signal is at a power level that is too high when received at the base station, communication with this particular mobile unit is acceptable, but this high power signal acts as interference to other mobile units. This interference may adversely affect communications with other mobile units.

Path loss in the radio channel is defined as any degradation or loss suffered by a signal as it travels over-the-air and can be characterized by two separate phenomena: average path loss and fading. The forward link, i.e., the link from the base station to the mobile unit, typically but not necessarily operates on a different frequency than the reverse link, i.e., the link from the mobile unit to the base station. Nevertheless, because the forward and reverse link frequencies are within the same frequency band, a significant correlation exists between the average path loss of the two links. For example, a typically cellular system has one of its forward link channels centered about 882 MHz paired with one of its reverse link channels centered about 837 MHz. On the other hand, fading is an independent phenomenon for the forward link and reverse link and varies as a function of time. The characteristics of fading on the channel are the same, however, for both the forward and reverse link because the frequencies are within the same frequency band. Therefore, the average of channel fading over time for both links is typically the same.

In an exemplary CDMA system, each mobile unit estimates the path loss of the forward link based on the total power at the input to the mobile unit. The total power is sum of the power from all base stations operating on the same frequency assignment as perceived by the mobile unit. From the estimate of the average forward link path loss, the mobile unit sets the transmit level of the reverse link signal.

Mobile unit transmit power is also controlled by one or more base stations. Each base station with which the mobile unit is communicating measures the received signal strength from the mobile unit. The measured signal strength is compared to a desired signal strength level for that particular mobile unit at that base station. A power adjustment command is generated by each base station and sent to the mobile unit on the forward link. In response to the base station power adjustment commands, the mobile unit increases or decreases the mobile unit transmit power by a predetermined amount.

When a mobile unit is in communication with more than one base station, power adjustment commands are provided from each base station. The mobile unit acts upon these multiple base station power adjustment commands to avoid transmit power levels that may adversely interfere with other mobile unit communications and yet provide sufficient power to support communication from the mobile unit to at least one of the base stations. This power control mechanism is accomplished by having the mobile unit increase its transmit signal level only if every base station with which the mobile unit is communicating requests an increase in power level. The mobile unit decreases its transmit signal level if any base station with which the mobile unit is communicating requests that the power be decreased. A system for base station and mobile unit power control is disclosed in U.S. Pat. Nos. 5,056,109, 5,265,119, 5,257,283, and 5,267,262; all of which are incorporated by this reference and assigned to the assignee of the present invention.

Base station diversity at the mobile unit is an important consideration in the soft handoff process. The power control method described above operates optimally when the mobile unit communicates with each base station through which communication is possible, typically between one to three base stations although a greater number is possible. In so doing, the mobile unit avoids inadvertently interfering with communications through a base station that is receiving the mobile unit's signal at an excessive level, but that cannot communicate a power adjustment command to the mobile unit because communication is not established with the mobile unit.

Each base station coverage area has two handoff boundaries. A handoff boundary is defined as the physical location between two base stations where the link would perform the same regardless of whether the mobile unit were communicating with the first or second base station. Each base station has a forward link handoff boundary and a reverse link handoff boundary. The forward link handoff boundary is defined as the location where the mobile unit's receiver would perform the same regardless of which base station it was receiving. The reverse link handoff boundary is defined as the location of the mobile unit where two base station receivers would perform the same with respect to that mobile unit.

Ideally these boundaries should be balanced, meaning that they have the same physical location with respect to the base station. If they are not balanced, system capacity may be reduced as the power control process is disturbed or the handoff region unreasonably expands. Note that handoff boundary balance is a function of time, in that the reverse link power increases as the number of mobile units increases. Reverse link power is inversely proportional to coverage area. Therefore all other conditions remaining static, an increase in reverse link power decreases the effective size of the coverage area of the base station and causes the reverse link handoff boundary to move inward towards the base station. Unless a compensation mechanism for the forward link is incorporated in the base station, even a system that is initially perfectly balanced will be unbalanced intermittently depending on the loading of the base station.

In a working cellular, personal communication, or wireless local loop system, fluctuation in loading are common. For example, if an accident occurs on a major freeway at rush hour, the resultant traffic jam can cause a substantial increase in the number of system users trying to access the system. Planned events, such as large sporting events, conferences, and parades, can have the same effect. A large fluctuation in loading that increases the number of users far beyond the average expected loading may overload the system. If the overload is substantial, requests for new communication links must be denied. Although the overload situation is undesirable, the obvious alternative of providing additional capacity to every base station in the system is impractical. Presently, however, no such method or apparatus exists by which overload situations can be avoided without temporarily interrupting or degrading system performance.

Furthermore, when a base station requires routine or unexpected maintenance, the base station must be removed from the system and replaced when maintenance is complete. It is important in removing and replacing the base station, however, to maintain normal operation of the system and to prevent interruption of any ongoing system communications. Conventional systems, however, provide no means by which a base station can be removed from and returned to the system when the base station requires maintenance without deleterious effects on system performance.

Therefore, a need exists for an apparatus and method for efficiently handling and avoiding overload situations and for maintaining normal system operations when performing base station maintenance.

SUMMARY OF THE INVENTION

Accordingly, the present invention is directed to an apparatus and method for adding and removing a base station from a communication system that prevents system overloads, that provides unaffected service during base station maintenance, and that substantially obviates one or more of the problems due to the limitations and disadvantages of the related art.

To achieve these and other advantages, and in accordance with the purpose of the invention as embodied and broadly described herein, the present invention defines a method and apparatus for adding a new base station to a communication system and/or removing a base station from the system. The present invention is well-suited to adding a new base station operating a predetermined frequency to an existing network of base stations operating the same predetermined frequency when an increased load on the system creates a need for an additional base station or stations. It also can be used to remove a base station from the network of base stations when the load decreases, making the removed base station unnecessary. In addition, the present invention can be used to remove and replace a base station (or a separate sector of a base station) when maintenance or upgrading is required. The process of adding a base station to the system (or "cell blossoming") requires expansion of the forward and reverse link coverage areas in unison of the new base station. Removing a base station (or "cell wilting") requires contraction of the forward and reverse link coverage areas in unison of the removed base station.

Before adding a new base station to the existing network, the forward link (or transmit) power and the reverse link (or receive) signal power of the new base station are both approximately equal to zero. To begin the process of adding the new base station, an attenuator in the receive path of the new base station is set to a high path loss or high attenuation level, creating a high level of artificial noise receive power. An attenuator in the transmit path is also set to a high attenuation level, which in turn causes a low transmit power level. The high level of artificial noise receive power results in the reverse link coverage area of the new base station being very small. Similarly, because the forward link coverage area is directly proportional to the transmit power, the very low transmit power level results in the forward link coverage area also being very small.

The process then continues by adjusting the attenuators in the receive and transmit paths in unison. The attenuation level of the attenuator in the receive path is decreased, thereby decreasing the level of artificial noise receive power, increasing the natural signal level, and hence increasing the size of the reverse link coverage area. The attenuation level of the transmit path attenuator is also decreased, thereby increasing the transmit power level of the new base station and expanding its forward link coverage area. The rate at which the transmit power is increased and the artificial noise receive power is decreased must be sufficiently slow to permit handoff of calls between the new and surrounding base stations as the new base station is added to or removed from the system.

As the new base station is added to the system, the receive and transmit powers are varied in correspondence with one another. That is, when adding the new base station, the transmit power is increased in correspondence with the decrease in the artificial noise receive power of the new base station. Accordingly, as the transmit power is increased by one dB, the artificial noise receive power is decreased by one dB. This one-to-one correspondence in transmit and receive power is maintained throughout the process of adding the new base station to the system.

Preferably, the process of adding the new base station is complete when the new base station's transmit power reaches a predetermined, desired level. Alternatively, if the base stations are equipped with "cell breathing" apparatus (described below), the process of adding the new base station is complete when the system reaches an "equilibrium" state among all the base stations in the system.

Each of the existing base stations has two coverage areas: an isolated coverage area and an effective coverage area. The isolated coverage area refers to the maximum coverage that a base station can have and is defined by the condition when the base station is isolated from all other base stations, i.e., is the only operated base station in the system. The effective coverage area is the boundary around the base station within which mobile units are communicating with the base station. The effective coverage area moves in and out in response to the load on the base station.

When the new base station is added to the system, its reverse link and forward link coverage areas increase from essentially zero. If the system is equipped for cell breathing, this process continues, maintaining the reverse and forward link coverage areas in a balanced relationship, i.e., at essentially the same size. At the same time, the system decreases the effective forward and reverse link coverage areas of the existing base stations adjacent the new base station. Accordingly, the effective coverage areas of the adjacent base stations contract while the new base station's coverage areas expand. With cell breathing capacity, this contraction and expansion continues until the adjacent base stations and the new base station are equally loaded, i.e., the system attains equilibrium. Alternatively, contraction and expansion may cease when the transmit power level of the new base station reaches a predetermined desired level (the desired level being limited by the maximum power rating of the new base station).

In a system equipped for cell breathing, after attaining equilibrium, as loading increases and decreases for various base stations, causing their effective reverse link coverage areas to expand and contract, the forward link coverage area boundary is matched to the reverse link coverage area. Thus, after the cell blossoming process is complete, the coverage areas for the base stations "breathe" in and out together.

The process of removing an existing base station from the network of base stations (or cell wilting) is the reverse of cell blossoming. Thus, the coverage areas for the removed base station contract. This process continues until the forward and reverse link coverage areas for the removed base station are approximately equal to zero. The result is that the removed base station is no longer operational, and the effective coverage areas of the adjacent base stations expand to fill the area vacated by the removed base station. Like cell blossoming, cell wilting can be performed without the occurrence of malfunctions or interruptions in system operation. In the apparatus and method of the present invention, information can be communicated over the communications system using CDMA. CDMA is a direct sequence spread spectrum method of multiplexing transmissions by encoding the transmissions so that they are each distinctive. CDMA multiplexing permits a larger number of transceivers (i.e., mobile telephone units) to communicate within the system than would otherwise be possible without this spread spectrum technique.

It is to be understood that both the foregoing general description and the following detailed description are exemplary and explanatory only and are not restrictive of the invention, as claimed.

The accompanying drawings are included to provide a further understanding of the invention and are incorporated in and constitute a part of this specification, to illustrate the embodiments of the invention, and, together with the description, to explain the principles of the invention.

BRIEF DESCRIPTION OF THE DRAWINGS

FIGS. 5A–5C illustrate the cell blossoming in an exemplary system.

DETAILED DESCRIPTION OF THE INVENTION

Figure 1:
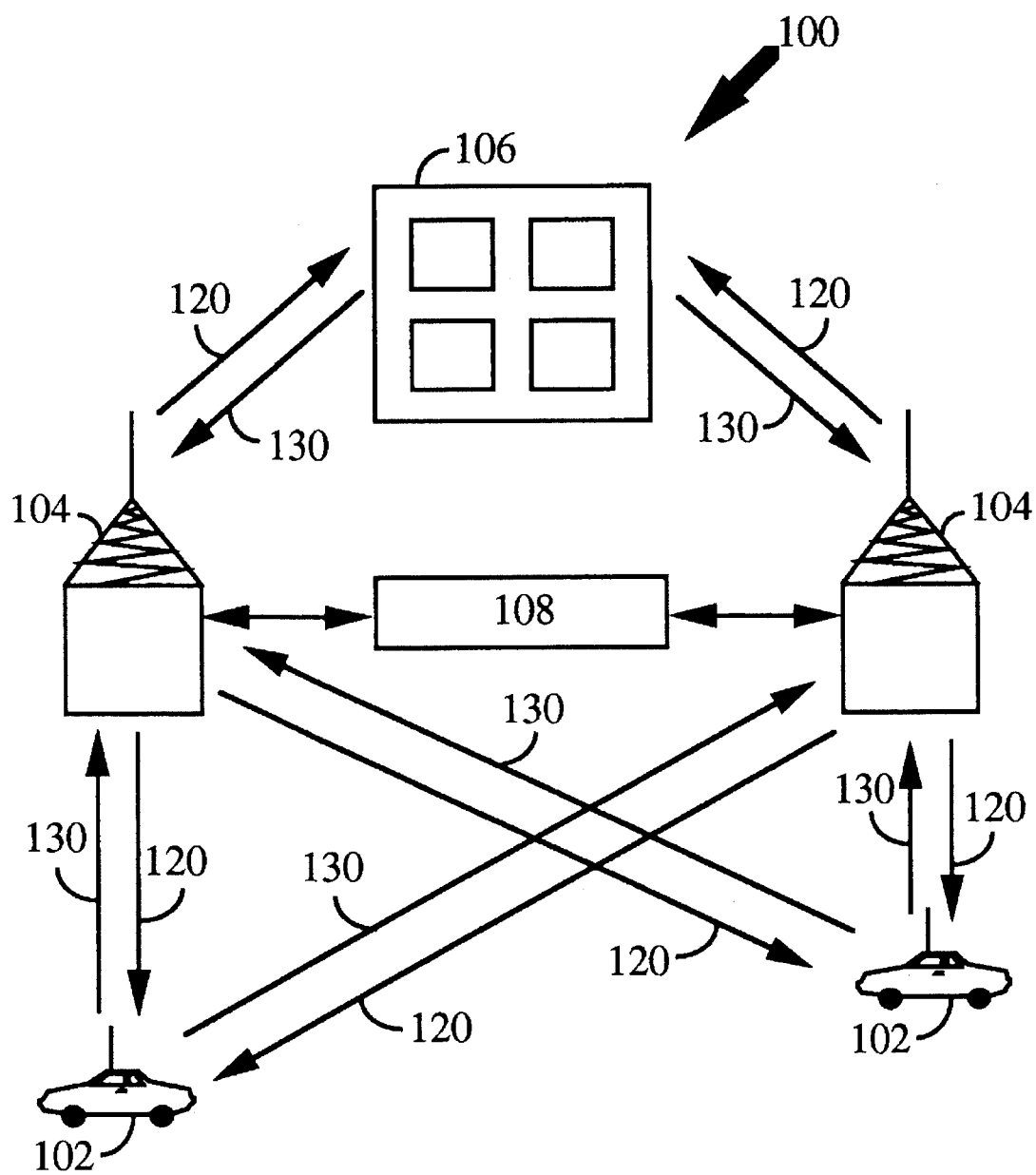
FIG. 1 is a schematic overview of an exemplary mobile cellular telephone system.

Reference will now be made in detail to the present preferred embodiment of the invention, an example of which is illustrated in the accompanying drawings. Wherever possible, the same reference numerals will be used throughout the drawings to refer to the same or like parts.

An exemplary embodiment of a terrestrial cellular mobile telephone system 100 in which the present invention may be embodied is illustrated in FIG. 1. The system illustrated in FIG. 1 may utilize time division multiple access (TDMA), CDMA, or other modulation techniques in communications between the mobile units 102 and the base stations 104. Cellular systems in large cities may have hundreds or thousands of mobile units 102 and many base stations 104. Nevertheless, the present system is not limited to mobile units 102 and may be used to interconnect fixed position cellular communications devices. For example, a remote unit 106 can be supplied at a building in order to send and receive data and/or voice communications between some device in the building and a home base 108 that collects the data. Transmissions from the base stations 104 to the mobile units 102 and remote unit 106 are sent on a forward link 120, while transmissions in the opposite direction are sent on a reverse link 130.

Figure 5A:
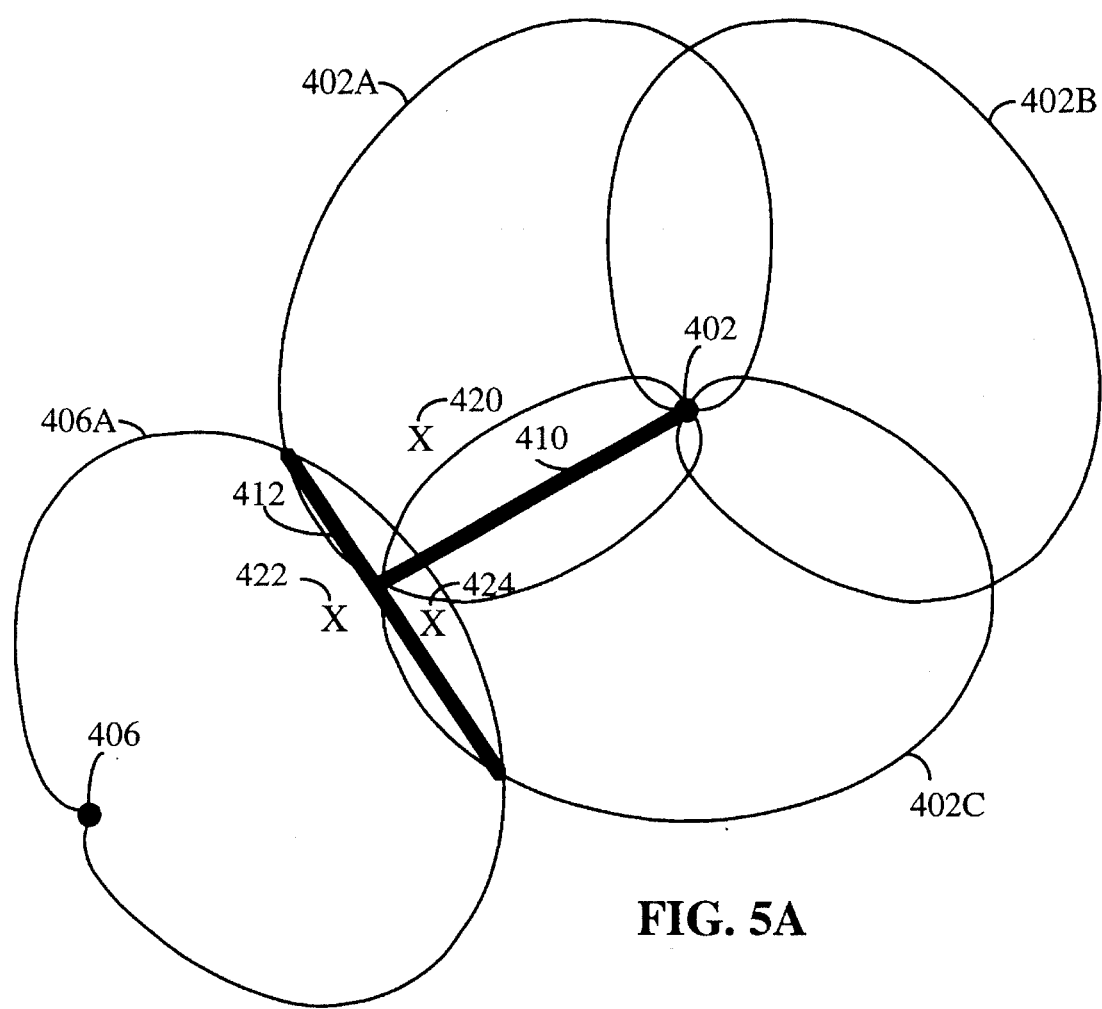
Figure 5B:
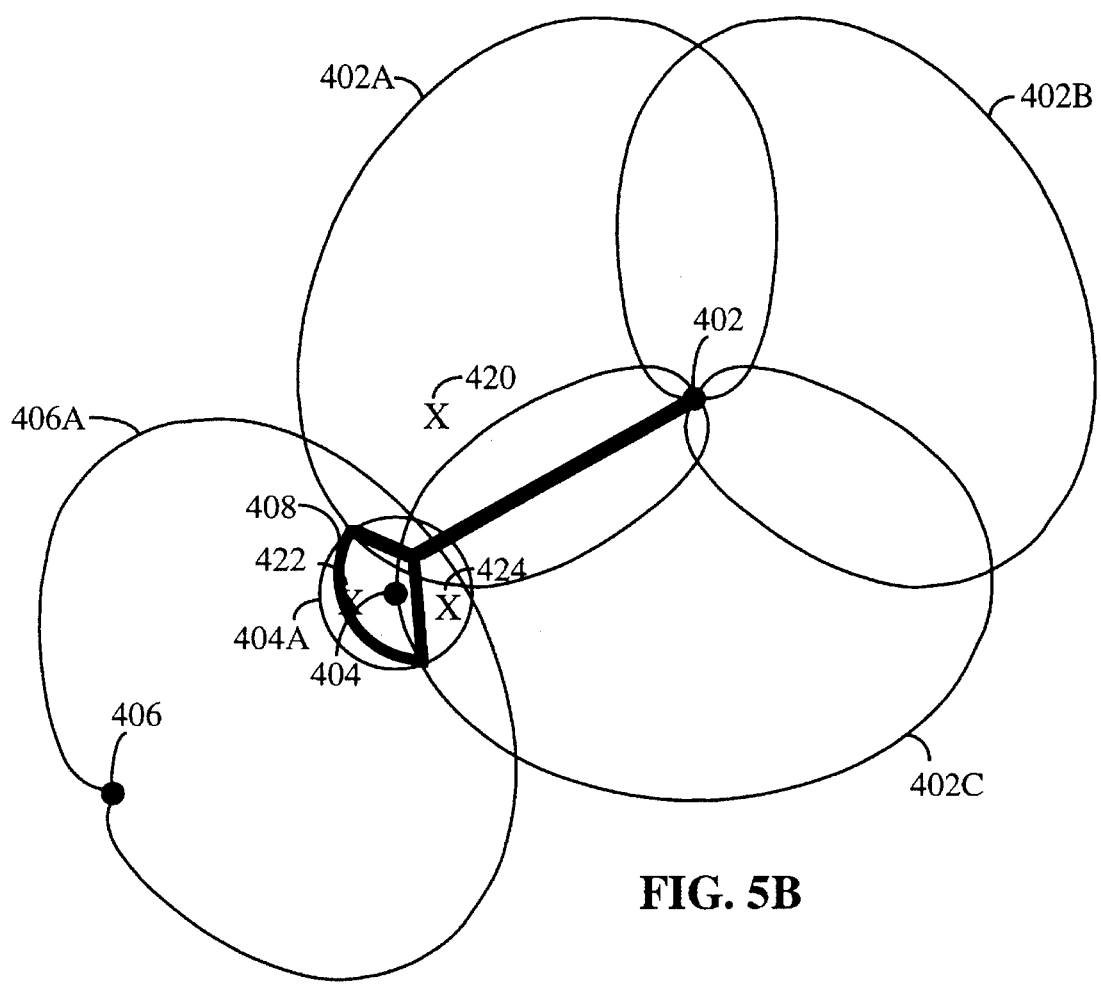
Figure 5B:
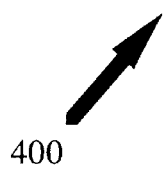

A typical cellular, personal communication, or wireless local loop system, such as that illustrated in FIG. 1, contains some base stations having multiple sectors. A multi-sectored base station comprises multiple independent transmit and receive antennas as well as independent processing circuitry. The present invention applies equally to each sector of a sectorized base station and to single sectored independent base stations. For the remainder of this description, therefore, the term "base station" can be assumed to refer to either a sector of a multi-sectored base station or a single sectored base station. FIGS. 5A–5C, discussed in detail subsequently herein, show an exemplary three sector base station 402.

In accordance with the present invention, an apparatus and method are provided for adding and removing a target base station in a network of existing base stations. The network includes base stations adjacent the target base station. The target base station has a receive power level and a transmit power level. The adjacent base stations and the target base station each define a forward link coverage area and a reverse link coverage area. The apparatus comprises a first attenuator for decreasing and increasing the level of artificial noise receive power and thereby expanding and contracting the reverse link coverage area of the target base station. The apparatus also comprises a second attenuator for increasing and decreasing the transmit power level and thereby expanding and contracting the forward link coverage area of the target base station. The attenuation levels of the first and second attenuators are controlled by a controller. In response to expansion of the reverse and forward link coverage areas of the target base station, the effective forward and reverse link coverage areas of the adjacent base stations contract. In response to contraction of the reverse and forward link coverage areas of the target base station, the forward and reverse link coverage areas of the adjacent base stations expand.

Each base station coverage area has two handoff boundaries. A handoff boundary is defined as the physical location between two base stations where the link would perform in the same manner regardless of which of the base station the mobile unit was in communication with. Each base station has a forward link handoff boundary and a reverse link handoff boundary. The forward link handoff boundary is defined as the location where the mobile unit's receiver would perform the same regardless of which base station it was receiving. The reverse link handoff boundary is defined as the location of the mobile unit where two base station receivers would perform the same with respect to that mobile unit. The present invention is described herein in the preferred embodiment based on a system having soft handoff capability. However the invention is equally applicable to all types of handoff operation.

It is beneficial to balance (i.e. align) the reverse link handoff boundary to the forward link handoff boundary, or vice versa, in order to maximize system capacity. A handoff boundary is always defined between at least two base stations. For example in FIG. 2A forward link handoff boundary 60 is a function of the power transmitted from base station 10 and from base station 40 as well as interference from other surrounding base stations (not shown) and other inband sources. Reverse link handoff boundary 50 is a function of the power level received at base station 10 and base station 40 from a mobile unit at that location and the power level received at base station 10 and base station 40 from the other mobile units and other inband sources and any noise generated by the receiver in base stations 10 and 40.

Figure 2A:
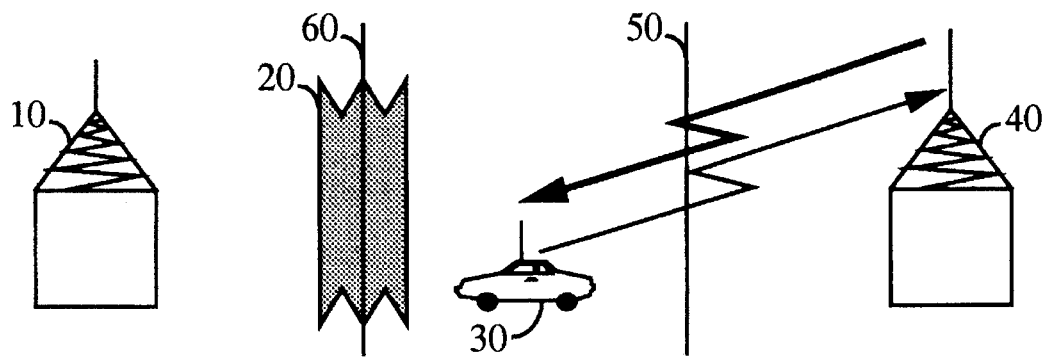
FIGS. 2A–2C show three unbalanced handoff conditions.

Ideally the forward link handoff boundary and the reverse link handoff boundary are co-located so that the optional system capacity may be achieved. If they are not co-located then three situations that are detrimental to capacity can occur. FIG. 2A shows the first of these situations. A soft handoff region is the physical region between two base stations where a mobile unit located within the region is likely to establish communication with both base stations. In FIG. 2A the shaded portion represents soft handoff region 20.

In mobile unit assisted soft handoff, the handoff region is defined by the forward link characteristics. For example, in FIG. 2A soft handoff region 20 represents the region where both the signal quality from base station 10 and the signal quality from base station 40 are sufficient to support communications. When mobile unit 30 enters soft handoff region 20, it will notify whichever base station it is in communication with that the second base station is available for communications. The system controller (not shown) establishes communication between with the second base station and mobile unit 30 as described in above mentioned U.S. Pat. No. 5,267,261. When mobile unit 30 is in soft handoff between base station 10 and base station 40, both base stations control the transmit power from mobile unit 30. Mobile unit 30 decreases its transmit power if either base station commands a decrease and increases its transmit power only if each base station commands for an increase as disclosed in the above mentioned U.S. Pat. No. 5,265,119.

FIG. 2A shows the first situation which is detrimental to system capacity. In FIG. 2A forward link handoff boundary 60 and reverse link handoff boundary 50 are significantly unbalanced (i.e. spaced apart). Mobile unit 30 is located in a position where communication is established only with base station 40. In the region where mobile unit 30 is located, the forward link performance is best with base station 40 but the reverse link performance would be better if mobile unit 30 were communicating with base station 10. In this situation mobile unit 30 is transmitting more power than it would be transmitting if it were in communication with base station 10. The increased transmit power adds unnecessarily to the total interference in the system thereby adversely effecting capacity. It also increases the overall power consumption of mobile unit 30 thereby decreasing its battery life. And it endangers the communication link if mobile unit 30 reaches its maximum transmit power and is unable to respond to commands for increased power.

Figure 2B:
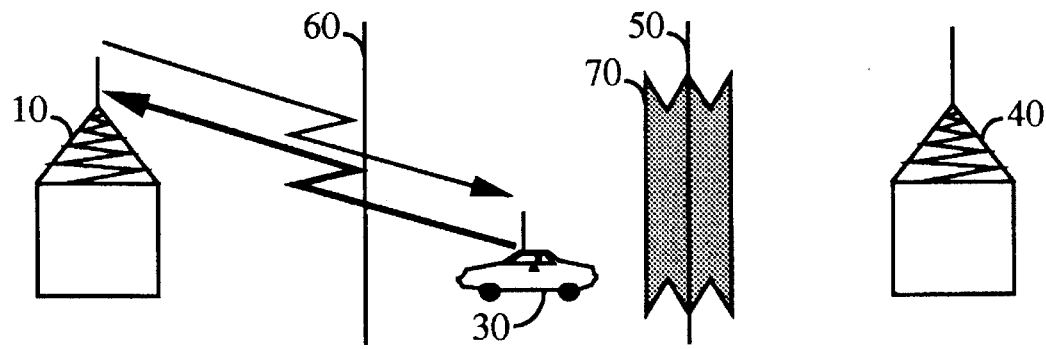

FIG. 2B show an alternative but also detrimental result of an unbalanced handoff condition. In FIG. 2B, soft handoff region 70 is positioned about reverse link handoff boundary 50. This handoff position could be the result of an alternative handoff scheme where handoff is based on the reverse link performance instead of the forward link performance. In one such case, each base station would attempt to measure the power received from each mobile unit. When the measured power level exceeds a threshold or exceeds the level received at other base stations, communication with a second base station is established. In FIG. 2B, mobile unit 30 is located in a region where communication is established only with base station 10. As in FIG. 2A in the region where mobile unit 30 is located, the forward link performance is best with base station 40 but the reverse link performance is best with base station 10. Unlike the reverse link, the forward link does not have a large dynamic range of transmit power and as mobile unit 30 moves toward base station 40, interference from base station 40 increases as the received power level from base station 10 decreases. If the power level from base station 10 falls below a sufficient signal to interference level or below a certain absolute level, the communication link is in danger being of lost. The power level transmitted from base station 10 is slowly increased within a limited dynamic range as mobile unit 30 moves away from base station 10. This increase in power adversely interferes with other users in base station 10 and base station 40 thus unnecessarily decreasing capacity.

Figure 2C:
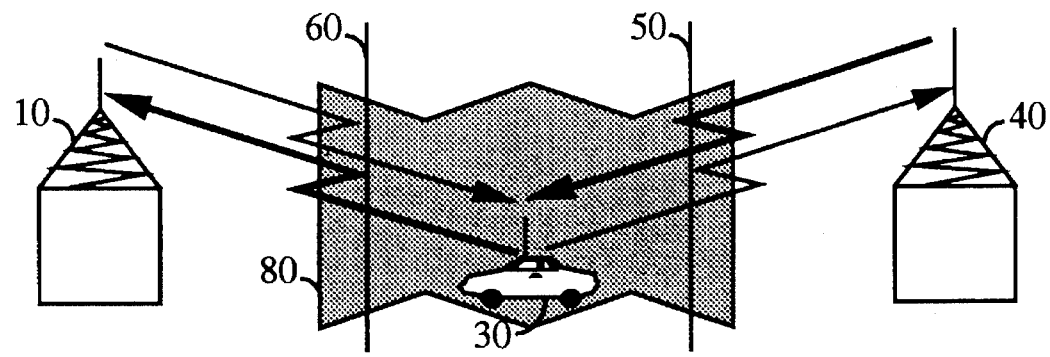

Yet another alternative is a combined handoff scheme based on both the forward link performance and the reverse link performance. FIG. 2C shows one such scenario. In FIG. 2C, handoff region 80 is large and encompasses both reverse link handoff boundary 50 and forward link handoff boundary 60. But unnecessary soft handoff directly decreases the capacity of the system. The purpose of soft handoff is to provide a make before break handoff between base stations and to provide an efficient power control mechanism. However if the soft handoff region is too large, the negative effects become significant. For example, in FIG. 2C, both base station 10 and base station 40 must transmit to mobile unit 30 while mobile unit 30 is in soft handoff region 80. Thus the total system interference is increased while mobile unit 30 is in soft handoff region 80. In addition, resources at both base station 10 and base station 40 must be dedicated to the signal received from mobile unit 30. Therefore increasing the size of the soft handoff region is not an efficient use of the system capacity and resources.

The solution to these adverse effects is to balance (i.e. collocate) the reverse link handoff boundary to the forward link handoff boundary or vice versa. This balance needs to be maintained during the addition or removal of a base station from the system. To add a base station, the forward link boundary set by the transmitted power is slowly increased. For optimal system performance, the reverse link handoff boundary should track the slowly expanding forward link handoff boundary. To remove a base station, the reverse link handoff boundary should track the slowly contracting forward link handoff boundary.

The forward link performance can be controlled by the base station. In an exemplary CDMA system, each base station transmits a pilot signal. The mobile units perform handoff based on the perceived pilot strength as described above. By changing the signal power of the pilot signal transmitted from the base station, the forward link handoff boundary location may be manipulated.

The reverse link performance can also be controlled by the base station. The noise performance of the base station receiver sets the minimum receive signal level that can be detected. The noise performance of the receiver is typically defined in terms of an overall system noise figure. By controlling the noise figure of the receiver, e.g., by injecting noise or adding attenuation, the reverse link performance, and hence the reverse link handoff boundary, may be adjusted.

The present invention uses a controllable attenuator in the reverse link path to control the reverse link coverage area. The attenuator is situated either before or after the base station low noise amplifier (LNA). The attenuator must be situation close enough to the LNA to effect the over all noise performance of the base station. The ideal location for the attenuator is before the LNA such that the attenuation level and the added noise level have a linear correlation. Due to the fact that most attenuators are not ideal and do not give zero attenuation at the minimum setting, optimal system performance in the limiting case of no required attenuation may dictate that the attenuator be placed after the LNA. When the LNA is placed after the LNA, the effect of the attenuator on the system will not have a one to one correspondence with the attenuation value and the system will have to be calibrated. The following scenario suggest an ideal configuration where the attenuator is place in front of the system LNA.

A variety of other mechanisms exists that can be used to control the function which in the preferred embodiment described herein is achieved with attenuators. For example, automatic gain control circuits (AGC) comprised of variable gain amplifiers can be used. The gain of the power amplifier and LNA can be varied. The actual performance of the antenna could be modified to provide the same effect. A controllable noise generator could be used to inject noise into the receiver.

In the exemplary handoff scheme described above, handoff boundaries are based on measurement of the base station's pilot signal strength at the mobile unit. An alternative to controlling the total transmit power of the target base station would be to control only its pilot signal level. To the coverage area designer this scheme may have some appeal, but controlling the total transmit power, including the traffic (e.g., active calls) and pilot signals, has some advantages. First, the ratio of the pilot signal to the traffic channel signal remains fixed. The mobile unit is expecting the ratio to be fixed and bases allocation of its resources on the ratio. If the mobile unit were to receive two equally powerful pilot signals, each corresponding to a traffic channel having a different power level, the demodulation of the two signals in the soft handoff process would be corrupted. Second, controlling the total transmit power reduces the interference to other base station coverage areas. If the pilot signal is not strong enough to warrant a handoff in the coverage area of a neighboring base station, the high powered traffic channel signal adds unusable and unnecessary interference to that area. The configurations of FIGS. 3 and 4 are based on controlling the total power transmitted from a base station.

Figure 3:
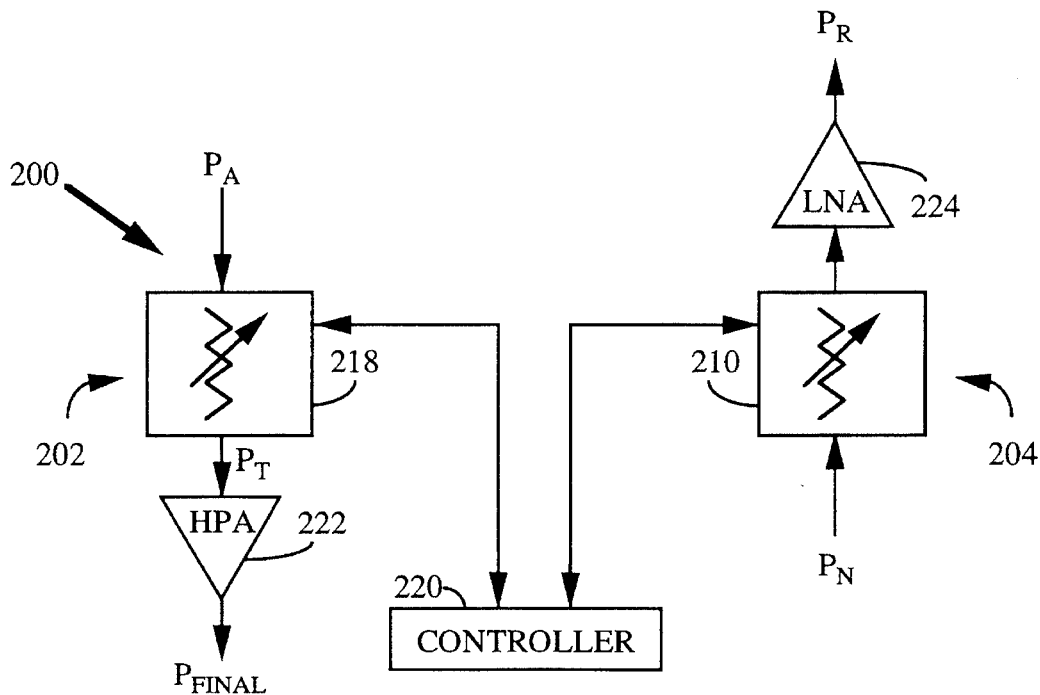
FIG. 3 is a block diagram of the base station apparatus in accordance with the present invention.
Figure 4:
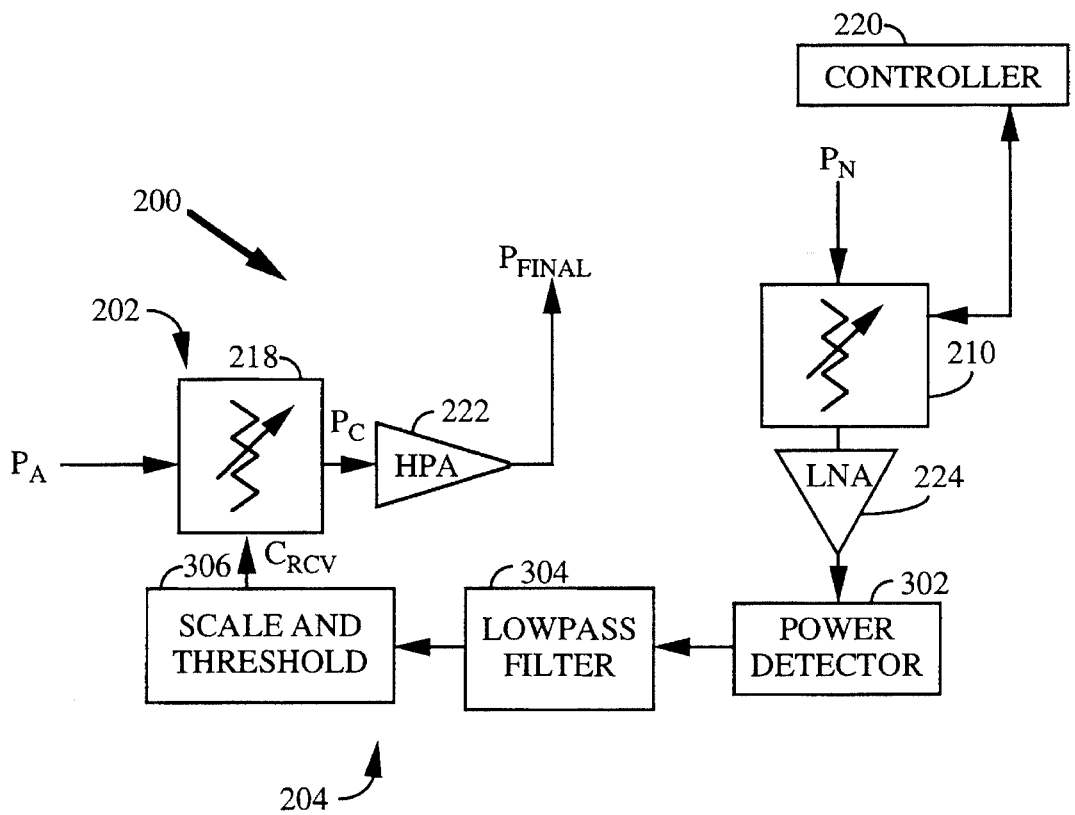
FIG. 4 is a block diagram of an alternative base station apparatus having cell breathing capacity in accordance with the present invention.

With reference to FIG. 3, the apparatus of the present invention for adding and removing a base station 200 from a network of existing base stations will be now described. The base station 200 has a transmit path 202 and a receive path 204. In the receive path is a first attenuator 210 that can be used to control a level of artificial noise receive power of the base station 200. The natural signal power ($P_N$) is input to the first attenuator 210 which varies the level of the natural signal power from the mobile units which reaches LNA 224 and which varies the level of artificial noise receive power perceived by the receiver. The output of LNA 224 ($P_R$) represents the sum of the attenuated natural signal power and artificial noise receive power as amplfied by LNA 224. In the transmit path 202 is a second attenuator 218, which is used to vary the transmit power level of the base station 200. The actual transmit power ($P_A$) is input to the second attenuator 218, which outputs the transmit power ($P_T$) to a high power amplifier 222, which in turn outputs the final transmit power ($P_{FINAL}$).

The attenuation levels of both the first and second attenuators 210, 218 are controlled by a controller 220. The controller 220 can vary the attenuation levels of the two attenuators 210, 218 in concert or independently. The controller 220, preferably a microprocessor based unit, can be designed such that it varies the attenuation levels of the two attenuators 210, 218 such that there is a correspondence, i.e., dB for dB, in the effect of both attenuators. Thus, in response to the controller 220, for each 1 dB increase or decrease in the first attenuator 210, the second attenuator 218 will also experience an increase or decrease in attenuation of 1 dB. It should be understood, however, that the two attenuators 210, 218 need not have the same attenuation level, just that their attenuation levels increase and decrease at the same rate.

During the cell blossoming and wilting processes, the forward and reverse link coverage areas (and handoff boundaries) are preferably balanced. It is beneficial to balance the reverse link handoff boundary to the forward link handoff boundary, or vice versa, in order to maximize system capacity even when the target base station is fully blossomed and operating in a static condition. The signal to interference level of the forward link signal received at a mobile unit is a function of the number of other mobile units located within that base station's coverage area. As the loading on one base station increases, the forward link handoff boundary shrinks toward the base station. The reverse link boundary is not effected in the same manner. Thus, a system that is initially balanced may become unbalanced over time.

To balance the forward and reverse link handoff boundaries, the size of the base station coverage area can be made to "breathe" in and out. Breathing effectively moves the reverse link handoff boundary to the same location as the forward link handoff boundary. The process of "cell breathing" can be used to maintain the coverage areas (and handoff boundaries) of the target base station in alignment. In a system with cell breathing capacity, each base station in the system is initially calibrated such that the sum of the unloaded receiver path noise and the desired pilot power is equal to a calibration constant. As the cellular system becomes loaded (i.e., mobile units begin to communicate), a compensation network maintains a constant relationship between the receive power and the pilot power transmitted by each base station. The loading of a base station effectively moves the reverse link coverage area closer to the base station. To obtain the same effect on the forward link, i.e., moving the forward link coverage area closer, the pilot power is decreased as loading is increased. Cell breathing is described in co-pending U.S. patent application Ser. No. 08/278,347, filed Jul. 17, 1994, entitled "METHOD AND APPARATUS FOR BALANCING THE FORWARD LINK HANDOFF BOUNDARY TO THE REVERSE LINK HANDOFF BOUNDARY IN A CELLULAR COMMUNICATION SYSTEM" assigned to the assignee of the present invention.

For breathing to be effective, the reverse link handoff boundary and the forward link handoff boundary must be initially aligned. Each of these boundaries is dependent on the performance of at least two base stations. As shown below, to align the two boundaries, the sum of the performance of the forward link to the performance of the reverse link should be same for all the base stations in the system.

Using the pilot signal strength to control the forward link handoff boundary and the noise figure to control the reverse link handoff boundary, an overall system constant must be chosen. Rather than try to force all the base stations to be equal, the easiest method is to define a constant and change the performance of every base station to match the constant. In the interest of system performance, the minimum increase in noise is desired. Therefore to define the constant, $K_{level}$, for each base station, the following equation is used:

$$K_{level} = \mathop{MAX}_{\text{all } i} [N_{Rx:i} + P_{Max:i}] \qquad \text{Eq. 1}$$

where:

$N_{Rx:i}$ is the receiver path noise of base station i in dB;

$P_{Max:i}$ is the maximum desired pilot signal power of base station i in dB; and MAX all i [ ] finds the largest such sum of all base stations in a system.

To prove that setting the sum of the received power and the transmitted power to a $K_{level}$ indeed balances the system, several assumptions are made. The first is that in any base station using multiple redundant receive and transmit antennas, the antennas have been balanced to have the same performance. Also it assumes that the identical decoding performance is available at each base station. It assumes a constant ratio between total forward link power and pilot signal power and reciprocity in the forward link path loss and the reverse link path loss.

To find the forward link handoff boundary between two arbitrary base stations, base station A and base station B, start by noting that the forward handoff boundary occurs where the pilot power of the two base stations is equal. Assume that mobile unit C is located at the boundary, mathematically:

$$\frac{\text{Pilot Power of } A \text{ Rx'd at } C}{\text{Total Power Received at } C} = \frac{\text{Pilot Power of } B \text{ Rx'd at } C}{\text{Total Power Received at } C} \quad \text{Eq. 2}$$

Noting that the power received at the mobile unit is equal to the power transmitted times the path loss, the above becomes:

$$\frac{\text{Pilot Power Tx'd from } A \times \text{Path loss from } A \text{ to } C}{\text{Total Power Received at } C} = \quad \text{Eq. 3}$$

$$\frac{\text{Pilot Power Tx'd from } B \times \text{Path loss from } B \text{ to } C}{\text{Total Power Received at } C}$$

Re-arranging the last equation and eliminating the common denominator, yields:

$$\frac{\text{Pilot Power Tx'd from } A}{\text{Pilot Power Tx'd from } B} = \frac{\text{Path loss from } B \text{ to } C}{\text{Path loss from } A \text{ to } C} \quad \text{Eq. 4}$$

Following the same procedure for the reverse link and noting that the reverse link handoff boundary occurs where each base station perceive the same signal to interference ratio for that mobile station:

$$\frac{\text{Power of } C \text{ Rx'd at } A}{\text{Total Power Received at } A} = \frac{\text{Power of } C \text{ Rx'd at } B}{\text{Total Power Received at } B} \quad \text{Eq. 5}$$

Noting that the power received at the base station is equal to the power transmitted times the path loss, this last equation becomes:

$$\frac{\text{Power Tx'd from } C \times \text{Path loss from } C \text{ to } A}{\text{Total Power Received at } A} = \quad \text{Eq. 6}$$

$$\frac{\text{Power Tx'd from } C \times \text{Path loss from } C \text{ to } B}{\text{Total Power Received at } B}$$

Re-arranging this equation and eliminating the common numerator, yields:

$$\frac{\text{Total Power Received at } A}{\text{Total Power Received at } B} = \frac{\text{Path loss from } C \text{ to } A}{\text{Path loss from } C \text{ to } B} \quad \text{Eq. 7}$$

Due to the assumed reciprocity in the forward and reverse link path loss at any location, Equations 4 and 7 may be combined to yield:

$$\frac{\text{Total Power Received at } A}{\text{Total Power Received at } B} = \frac{\text{Pilot Power Tx'd from } B}{\text{Pilot Power Tx'd from } A} \quad \text{Eq. 8}$$

Changing the units of Equation 8 from linear power to dB yields:

$$\text{Total Power Received at A (dB)} - \text{Total Power Received at B (dB)} = \text{Pilot Power Tx'd from B (dB)} - \text{Pilot Power Tx'd from A (dB)} \quad \text{Eq. 8'}$$

Equation 8' is equivalent to premise set forth in that:
if Total Power Received at A (dB)+Pilot Power Tx'd from A (dB)=$K_{level}$
and Total Power Received at B (dB)+Pilot Power Tx'd from B (dB)=$K_{level}$
then Equation 8 will be satisfied, and the forward link handoff boundary and the reverse link handoff boundary are co-located.

Three mechanisms are need to perform the breathing function: a means of initially setting performance to $K_{level}$, a means of monitoring the fluctuations in the reverse link, and a means of changing the performance of the forward link in response to the reverse link fluctuations.

One method of initially setting the performance to $K_{level}$ is to measure the maximum available pilot signal strength taking into account the variation over temperature and time and adding attenuation in line with the receiver in a no input signal condition until the $K_{level}$ performance is achieved. Adding attenuation desensitize the receiver and effectively increases the noise figure thereof. This also requires that each mobile unit transmit proportionately more power. The added attenuation should be kept to the minimum dictated by $K_{level}$.

Once initial balance is achieved, the power coming into the base station can be measured to monitor the reverse link performance. Several methods can be used. Measurement can be done by monitoring an AGC (automatic gain control) voltage or by directly measuring the incoming level This method has the advantage that if a jammer is present (such as an FM signal) this energy will be measured and the handoff boundaries will be drawn closer to the base station. By drawing the handoff boundary closer to the base station the jammer may be eliminated from the coverage area of the base station and its effect minimized. Measurement could be made by simply counting the number of users communicating through the base station and estimating the total power based on the fact that each mobile unit's signal nominally arrives at the base station at the same signal level.

In an ideal configuration, the breathing mechanism would measure the receive power and change the transmit power proportionately. However, some systems may not use the proportional method and may instead change the transmit level only a fraction of the perceived changed in receive power. Another alternative changes the transmit level only when the receiver level exceeds a predetermine threshold. This method could be used to primarily deal with jammers.

Referring now to FIG. 4, the base station 200 may be equipped with cell breathing apparatus, which renders the transmit power responsive to fluctuations in the receive power. In this cell breathing apparatus, the receive path 204 includes not only the first attenuator 210 and LNA 224, but also a power detector 302, which generates a power level output signal indicating the total power in the total output power from at the output of LNA 224. A lowpass filter 304 averages the power level output signal. A scale and threshold component 306 sets the desired ratio and offset of the relation between increases in the receive power and decreases in transmit power and outputs a control signal ($C_{RCV}$).

The transmit path 202 controls the transmit power in response to variations in the receive power. The control signal ($C_{RCV}$) output by the scale and threshold component 306 is input to the second attenuator 218 in the transmit path 202. The second attenuator 218 generates a comparative transmit power ($P_C$), which is a function of the actual transmit power ($P_A$) of the base station 200 and $C_{RCV}$. The second attenuator 218 adjusts the transmit power of the base station 200 in response to the receive power of the base station 200 so that the transmit power essentially tracks the receive power dB for dB. Thus, as the receive power increases 1 dB, the transmit power also increases approximately 1 dB. The comparative transmit power ($P_C$) output by the second attenuator 218 is input to the high power amplifier 220, which amplifies $P_C$ and thereby generates the final output transmit power signal ($P_{FINAL}$).

The rate at which cell blossoming and wilting are performed is governed by the rate at which a soft handoff can be accomplished. In present systems, the fastest a soft handoff can be accomplished is approximately 1/10 of a second. According to this time, to assure that a soft handoff occurs without disconnection or interruption of the call in progress, the transmit gain (which is measured in dB) is adjusted (via the second attenuator 218) at a rate of 1–2 dB/second. Preferably, however, to provide a margin for error in soft handoff, the transmit gain is adjusted at a lower rate, namely, less than 1 dB/second. Skilled artisans will recognize that, as the time required to accomplish a soft handoff decreases, the rate at which the transmit gain is adjusted can be increased. For example, if only 1/100 of a second were required to accomplish a soft handoff, transmit gain could be adjusted at a rate 10 times greater than that used today. The rate at which the first and second attenuators 210, 218 increase and decrease the receive and transmit power levels can be controlled to provide the requisite timing. An attenuator rate controller can be provided that is either fixed at a predetermined rate, or variable to account for different timing requirements for soft handoff. Those skilled in the art will recognize that such controllers can be implemented via hard wired or integrated circuitry or via software.

Referring now to FIGS. 5A–5C, cell blossoming is illustrated, showing how new base station 404 is added to network of existing base stations 400. Cell blossoming is useful in a variety of circumstances. For example, when the network 404 becomes heavily loaded with communicating mobile units—such as in a stadium parking lot preceding a sporting event, or in the event of a major traffic jam on a freeway—the network of existing base stations 400 may not have the capacity to handle the increased load. Therefore, unless the network's capacity is increased, some mobile units will be denied access to the cellular system. One way to remedy this problem is to add an additional base station to the network 400 to cope with the increased load. Cell blossoming is an effective way to add a base station to the network 400.

In accordance with the present invention, cell blossoming is performed such that the new base station 404 is added to the network 400 without affecting any other system operations, including calls in progress. Before the cell blossoming process commences, new base station 404 has approximately zero transmit power and approximately zero natural receive signal power from the mobile units and high artificial noise power. Base station sectors 402A, 402C, and 406A are providing coverage for the area in which new base station 404 will eventually operate during and after cell blossoming.

As the process of cell blossoming begins, the apparatus of new base station 404 performs a variety of functions. The controller 220 sets the attenuation levels of the first and second attenuators 210, 218 to a high level. The high attenuation level of the first attenuator 210 causes a high path loss in the receive path 204 of the new base station 402, which causes the artificial noise receive power of the new base station 402 to reach a high level. In response to the controller 220, the attenuation level of the first attenuator 210 decreases, causing the artificial noise receive power to decrease from the high level reducing the artificial noise received noise contribution to the total receive power ($P_R$) thus causing the reverse coverage area of the new base station 402 to expand. The controller also decreases the attenuation level of the second attenuator 218, preferably dB for dB with the effect of the attenuation level of the first attenuator 210. The actual transmit power ($P_A$) is input to the second attenuator 218, and the decreasing attenuation level of the second attenuator 218, in turn, causes the transmit power level ($P_T$) of new base station 404 to increase. As a result, the forward and reverse link coverage area of new base station 404 expands as shown by coverage area 404A in FIG. 5B.

In FIG. 5A dark lines 410 and 412 mark the approximate handoff boundaries between sectors 402A, 402C, and 406A such that mobile unit 420 is communicating through sector 402A, mobile unit 424 is communicating through sector 402C, and mobile unit 422 is communicating through sector 406A. In FIG. 5B the expanded coverage area of base station 402 has expanded to coverage area 404A. The handoff boundaries between sectors 404A and sectors 402A, 402C, and 406A is indicated by irregular shape 408. Due to the balance blossoming process, irregular shape 408 represents both the forward and reverse link handoff boundaries. Note that in FIG. 5B, mobile unit 422 is most likely in soft handoff between base station 404 and sector 406A.

As blossoming continues as shown in FIG. 5C, the forward and reverse link coverage area 404A continues to increase. In FIG. 5C, the effective coverage area has expanded as shown by the handoff boundaries illustrated by irregular shape 430. In FIG. 5C both mobile unit 422 and 424 are in communication with base station 404 because they are located on the interior of irregular shape 430. Thus sectors 402A, 402C, and 406A have reduced load of mobile units and network 400 is capable of handing more simultaneous calls.

If new base station 404 is equipped with the cell breathing apparatus of FIG. 4, operation of the apparatus of new base station 404 is as follows. As above, the attenuation level of the first attenuator 210 is set to a high level and is subsequently decreased. The power detector 302 detects a power level output indication, which is proportional to the receive power level of the new base station 402. After processing by the lowpass filter 304 and the scale and threshold component 306, control signal ($C_{RCV}$) is output to the second attenuator 218 in the transmit path 202 of the new base station 402. As described above, the second attenuator 218 processes $C_{RCV}$ together with the actual transmit power ($P_A$) of the new base station 402, and, in response to the decrease in the receive power, the transmit power of new base station 404 increases. In consequence, because the artificial noise receive power is decreasing and the transmit power is increasing, the reverse and forward link coverage areas of the new base station 402 both expand together maintaining alignment of the handoff boundaries.

The adjacent base stations 402 and 406 may include the same cell breathing apparatus (shown in FIG. 4) as the new base station 404. Thus, the adjacent base stations 402 and 406 may include apparatus for detecting the power level output indication proportional to the receive power and for adjusting their transmit power level in response to the power level output indication.

Cell blossoming ceases, as illustrated in FIG. 5C, when the new base station 404 reaches a predetermined desired transmit power level if breathing is not implemented. If breathing is implemented in the system, the coverage area of the new base station 404 depends on the existing load on the system. The final coverage area is a function of the new base station's 404 maximum power rating. It is also a function of the receive power of each of the base stations in the network 400. Other variables may include noise in the system, the number and location of mobile units communicating within the system, and the power rating of the other base stations.

In example of FIG. 5A–5C show cell blossoming is used to increase the number of active calls in the system. The reverse process would occur for cell wilting. Cell wilting can be used to remove a base station from service for repair. When the repair was complete, the base station would blossom back into operation.

Those skilled in the art will also recognize that the present invention can be used for a variety of different base stations. As discussed above, in cellular communications systems, base stations may be single or multiple "sectored." The coverage area of a single sector base station, a basically circular configuration, is illustrated in by coverage area 404A. Multiple sector base stations are also used such as base station 402 in FIG. 4 illustrates a having three sectors 402A, 402B, 402C, each sector providing approximately ⅓ of the coverage area of the base station 402. Base stations may have different numbers and configurations of sectors than that shown in FIG. 4. In most operating cellular system, each sector of a base station has two independent receive path which would require duplicate receive path antennas.

The present invention can be used in blossoming and wilting single or multiple sector base stations. For example, for the three-sectored base station 402 illustrated, when blossoming, each sector 604, 606, 608 will expand at the same rate. When wilting, each sector 402A, 402B, 402C will contract at the same rate. Moreover, any one or a combination of the sectors 402A, 402B, 402C can blossom or wilt independent of the others.

It will be apparent to those skilled in the art that various modifications and variations can be made in the apparatus and method of the present invention without departing form the spirit or scope of the invention. Thus, it is intended that the present invention cover the modifications and variations of this invention, provided they come within the scope of the appended claims and their equivalents.

What is claimed is:

1. An apparatus for adding a new base station to a network of existing base stations, said network of existing base stations including a plurality of adjacent base stations adjacent to said new base station, said new base station having an artificial noise receive power level and a new transmit power level, said new base station defining a forward link coverage area and a reverse link coverage area and said plurality of adjacent base stations each defining an effective forward link coverage area and an effective reverse link coverage area, said apparatus comprising:

a controller for controlling attenuation levels;

a first attenuator having a first attenuation level for setting said artificial noise receive power level to a power setting in response to said controller setting said first attenuation level to a first attenuation setting, and for decreasing said artificial noise receive power level from said power setting in response to said controller decreasing said first attenuation level to a second attenuation setting, thereby expanding said reverse link coverage area of said new base station; and a second attenuator for controlling said new transmit power level and for increasing said new transmit power level, thereby expanding said forward link coverage area of said new base station to match said expanded reverse link coverage area.

2. The apparatus recited in claim 1 wherein the second attenuator is comprised of a variable gain amplifier.

3. The apparatus recited in claim 1 wherein for each 1 dB the artificial noise receive power level is decreased, the new transmit power level is increased approximately 1 dB.

4. The apparatus recited in claim 1 wherein the controller includes a timer, said timer being set such that the controller decreases the first attenuation level at a rate of less than or equal to 1 dB/second.

5. The apparatus recited in claim 1 wherein the new base station has a total receive power level, the apparatus further comprising a power detector for detecting a new power level output indication proportional to said total receive power level of the new base station; wherein the controller increases the new transmit power level in response to said new power level output indication detected by said power detector.

6. The apparatus recited in claim 5 wherein each of the plurality of adjacent base stations has an adjacent receive power level and an adjacent transmitted power level and includes a power level compensation for detecting an adjacent power level output indication proportional to said adjacent receive power level and for adjusting said adjacent transmitted power level in response to said adjacent power level output indication.

7. The apparatus recited in claim 6 wherein a first product of the total receive power level and the new transmit power level is controlled to maintain in balance the forward and reverse link coverage areas of the new base station, and wherein a second product of the adjacent receive power level and adjacent transmit power level is controlled to maintain in balance the effective forward and reverse link coverage areas of each of the plurality of adjacent base stations.

8. The apparatus recited in claim 1 wherein the new base station has a predetermined desired transmit power level, and wherein cessation of expansion of the forward and reverse link coverage areas of the new base station is a function of said predetermined desired transmit power level.

9. An apparatus for removing an operating base station from a network of existing base stations, said network of existing base stations including a plurality of adjacent base stations adjacent said operating base station, said operating base station having an artificial noise receive power level and an operating transmit power level, said operating base station defining a forward link coverage area and a reverse link coverage area and said plurality of adjacent base stations each defining an effective forward link coverage area and an effective reverse link coverage area, said apparatus comprising:

a controller for controlling attenuation levels;

a first attenuator having a first attenuation level for increasing said artificial noise receive power level in response to said controller increasing said first attenuation level, thereby contracting said reverse link coverage area of said operating base station; and a second attenuator for decreasing said operating transmit power level, thereby contracting said forward link coverage area of said operating base station.

10. The apparatus recited in claim 9 wherein the second attenuator has a second attenuation level; and wherein the second attenuator decreases the operating transmit power level in response to the controller increasing the second attenuation level.

11. The apparatus recited in claim 10 wherein for each 1 dB the first attenuation level is increased, the second attenuation level is increased approximately 1 dB.

12. The apparatus recited in claim 10 wherein the controller includes a timer, said timer being set such that the controller increases the first and second attenuation levels at a rate of less than or equal to 1 dB/second.

13. The apparatus recited in claim 9 wherein the operating base station has a total receive power level, the apparatus further comprising a power detector for detecting an operating power level output indication proportional to said total receive power level of the operating base station; wherein the second attenuator decreases the operating transmit power level in response to said operating power level output indication detected by said power detector.

14. The apparatus recited in claim 13 wherein each of the plurality of adjacent base stations has an adjacent receive power level and an adjacent transmitted power level and includes a power level compensator for detecting an adjacent power level output indication proportional to said adjacent receive power level and for adjusting said adjacent transmit power level in response to said adjacent power level output indication.

15. The apparatus recited in claim 14 wherein a first product of the total receive power level and the operating transmit power level is controlled to maintain in balance the forward and reverse link coverage areas of the operating base station, and wherein a second product of the adjacent receive power level and adjacent transmit power level is controlled to maintain in balance the effective forward and reverse link coverage areas of each of the plurality of adjacent base stations.

16. The apparatus recited in claim 9 wherein cessation of contraction of the forward and reverse link coverage areas of the operating base station occurs when the operating transmit power level is approximately equal to zero.

17. A method for adding a new base station to a network of existing base stations, said network of existing base stations including a plurality of adjacent base stations adjacent said new base station, said new base station having an artificial noise receive power level and a new transmit power level, said new base station defining a forward link coverage area and a reverse link coverage area and said plurality of adjacent base stations each defining an effective forward link coverage area and an effective reverse link coverage area, said method comprising:

first setting a first attenuation level to a first attenuation setting;

second setting said artificial noise receive power level to a power setting in response to setting said first attenuation level to said first attenuation setting;

first decreasing said first attenuation level from said first attenuation setting and increasing said new transmit power level, thereby expanding said forward link coverage area of said new base station; and second decreasing said artificial noise receive power level from said power setting in response to decreasing said first attenuation level, thereby expanding said reverse link coverage area of said new base station.

18. The method recited in claim 17, further comprising third setting a second attenuation level to a second attenuation setting and third decreasing said second attenuation level from said second attenuation setting; wherein the new transmit power level is increased in response to decreasing said second attenuation level.

19. The method recited in claim 18, further comprising fourth decreasing the second attenuation level approximately 1 dB for each 1 dB decrease in the first attenuation level.

20. The method recited in claim 18 wherein the first and second attenuation levels are decreased at a rate of less than or equal to 1 dB/second.

21. The method recited in claim 17 wherein the new base station has a total receive power level, the method further comprising first detecting a new power level output indication proportional to said total receive power level of the new base station; wherein the new transmit power level is increased in response to said new power level output indication.

22. The method recited in claim 21 wherein each of the plurality of adjacent base stations has an adjacent receive power level and an adjacent transmit power level and, the method further comprising second detecting an adjacent power level output indication proportional to said adjacent receive power level; and adjusting said adjacent transmit power level in response to said adjacent power level output indication.

23. The method recited in claim 22, further comprising first controlling a first product of the total receive power level and the new transmit power level to maintain in balance the forward and reverse link coverage areas of the new base station; and second controlling a second product of the adjacent receive power level and adjacent transmit power level to maintain in balance the effective forward and reverse link coverage areas of each of the plurality of adjacent base stations.

24. The method recited in claim 17 wherein the new base station has a predetermined desired transmit power level, the method further comprising ceasing expansion of the forward and reverse link coverage areas of the new base station upon attaining said predetermined desired transmit power level.

* * * * *